March 16, 1943.                R. E. SNYDER                    2,313,780
                          DUCTILE TUBING CONNECTOR
                          Filed March 29, 1940           2 Sheets-Sheet 1

INVENTOR.
ROBERT E. SNYDER
BY
ATTORNEY.

March 16, 1943. R. E. SNYDER 2,313,780
DUCTILE TUBING CONNECTOR
Filed March 29, 1940 2 Sheets—Sheet 2

INVENTOR.
ROBERT E. SNYDER
BY Stuart M. Mauk
ATTORNEY.

Patented Mar. 16, 1943

2,313,780

UNITED STATES PATENT OFFICE 2,313,780

DUCTILE TUBING CONNECTOR

Robert E. Snyder, Pasadena, Calif., assignor to Snyder Research, Inc., a corporation of California Application March 29, 1940, Serial No. 326,699

8 Claims. (Cl. 285—122)

This invention relates to pipe joints or couplings, and more particularly to couplings of the type used to interconnect flexible or yielding pipe through the expedient of a thimble or ferrule freely revoluble upon one of the tubes to be interconnected and adapted to be engaged upon the other by means of screw threads formed on the thimble and thus join the two tubes in a leak-proof connection having sufficient strength to meet commercial requirements.

It is readily apparent that when couplings of the type indicated are used to interconnect sections of tubing, the cross-sectional area of the couplings will be relatively great compared with that of the tubing they serve to interconnect. Furthermore, the connectors being of greater diameter than the tubing on which they are mounted, they are materially stiffer than the tubing. As a result, whenever such a line of tubing is subjected to continued vibration or flexure, or both, very characteristic points of failure develop in the tubing. In general, these failures occur very close to the juncture of the tubing and the coupling; the exact point of failure depending upon the type of connector used, the type and physical uniformity of the tubing, the vibrational frequency and amplitude, the damping means used, the unsupported length of tube, and other variables. In the greater number of examples, the failure occurs less than one diameter of the enclosed tube away from the coupling or last point of support of the tubing by the coupling.

Scientifically, the explanation may be made in terms of stiffness. "Stiffness," according to one authority, is defined as "the resistance to deformation under stress," or "the restoring force per unit displacement," wherein the deformation is presumed not to exceed the elastic limit of the material under consideration, (Eshbach.) Thus in a train of directly connected members of differing individual stiffnesses, the "resistance to deformation" or the "restoring force per unit displacement" will vary from member to member. The general rule seems to hold that under vibrational or cyclical stresses, stress concentrations will be produced in the train at all junctures of members of differing stiffnesses.

In a tube subjected to repeated flexure, either cyclical or otherwise, each unit particle of the material of which the tube is composed, is subjected alternately to tension and compression stresses, this action being most pronounced near the outer surface of the tube. The particles are, therefore, alternately pulled apart and pressed toward each other, and, as such action continues, they become displaced with reference to each other within the structure of the material, and gradually produce a surface "wavyness" on the tube. These waves usually appear on circumferential arcs about the tube, and continued flexure tends to deepen the wave troughs until fissures occur at the bottoms of the troughs, which fissures gradually increase in length and width, ultimately uniting with other fissures, and a circumferential plane of weakness begins to develop. The resultant decrease in stiffness of the tubing along this plane causes a corresponding increase in the stress concentration in the weak portion and further hastens the action. When the fissure finally works clear through the tube, the process of progressive failure is complete. Any local corrosion may itself be the cause of a fissure or may aid in deepening a fissure as the oxide products created in the fissure act as a wedge to deepen it still further under continued flexure.

As an example, when a brass coupling is attached to a ductile copper tube in accordance with conventional practice, a construction is presented wherein a length of tubing consists of portions immediately adjacent each other and of different cross sectional area and hence possessing different degrees of stiffness, the portion having the lesser cross sectional area usually being the more flexible of the two. It is well known, however, that whenever a member of such a character is subjected to repeated flexure, a concentration of stress will be imposed upon the portion of lesser stiffness, immediately adjacent the point of its last support by the stiffer of the two portions. This accounts for the well recognized fact that the point of most probable failure of a conventional ductile copper tube, such as those regularly employed as oil lines, fuel lines, and compressed air conductors in many different types of mechanical installations, is in the tubing portion of such a line immediately adjacent any of the coupling thimbles.

An object of the present invention, therefore, is the provision of a novel type of coupling means for ductile tubing in which means are provided for avoiding concentration of stress in the more flexible of the two members which otherwise would be present when such a conductor is subjected to repeat flexure.

A more detailed object in this connection is to avoid the concentration of stress referred to by providing means for distributing stress which inevitably occurs when flexure of the tubing occurs. Inasmuch as it is out of the question to prevent the development of such stress, my present invention seeks to make the stress innocuous in so far as damage to the tubing is concerned, and this can best be accomplished by effecting the distribution of the stress over a material length of the tubing, and thus avoid the concentration of stress at a single point which heretofore has been the direct cause of failure in ductile copper tubing subjected to repeated flexure.

A further object of the present invention is to assure the distribution of stress referred to by means of a yielding resilient support for the more flexible of the two portions of the conductor, preferably carried by the stiffer of the two and extending therefrom in continuous contact with the more flexible member in such a manner as to attain the results desired. Other manners of approaching the problem and providing the distribution of stress by means of different types of support for the less stiff member, form the subject matter of my co-pending application, Serial No. 333,985 filed May 8, 1940.

Another object of my invention is to provide means resiliently supporting the more flexible of the two portions of the conductor, which means are carried by the stiffer member and engage the more flexible member in a sliding engagement, thereby enhancing the degree of flexibility of the assembled unit.

Another object of my invention is the provision of stress-distributing means for use in conjunction with the coupling for ductile metal tubing in the manner indicated, which interferes in no manner whatsoever with the efficiency of the coupling member as such, does not add materially to its cost of manufacture, and does not complicate or make more difficult the installation and/or servicing of the coupling member.

A further object is the provision of means for avoiding concentration of stress in a ductile metal tubing adjacent the couplings used in connection with that tubing, which does not detract materially from the flexibility of the tubing considered as a whole.

Yet another object of my invention is the provision of means for distributing stress over a material length of tubing adjacent the coupling used in connection with that tubing, which distributing means is constructed entirely of fire-proof and heat-resistant material, preferably of the same material as that of which the coupling member is constructed, and adapted to lend itself economically to large-scale production upon a quantity basis by automatic machinery.

The invention possesses other objects and features of advantage, some of which, with the foregoing, will be set forth in the following description of the preferred embodiments of my invention which are illustrated in the drawings accompanying and forming part of the specification. It is to be understood that I do not limit myself to the showing made by the said drawings and description, as I may adopt variations within the preferred embodiments within the scope of my invention as set forth in the claims.

Referring to the drawings:

Figure 1 is a longitudinal, medial sectional view of a portion of a coupling member having stress-distributing means embodying the principles of the present invention co-operatively disposed thereupon. A portion of the tube upon which the coupling member is intended to be positioned is shown in position to be thrust thereinto; and the stress-distributing elements are shown in the positions assumed thereby before engagement upon the tube.

Figure 1:
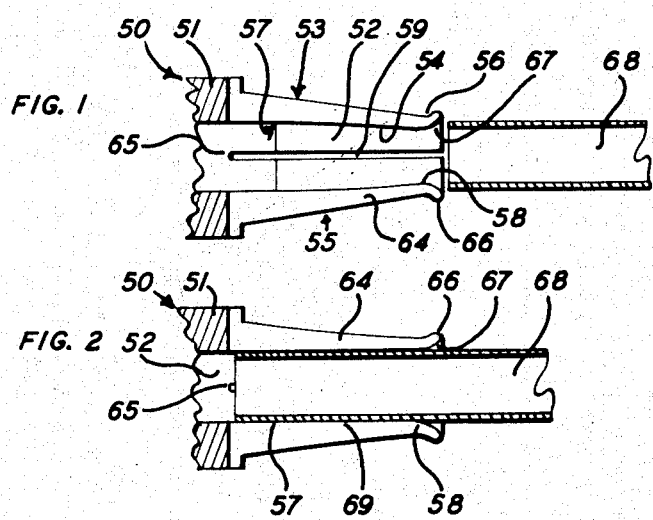
Figure 2:
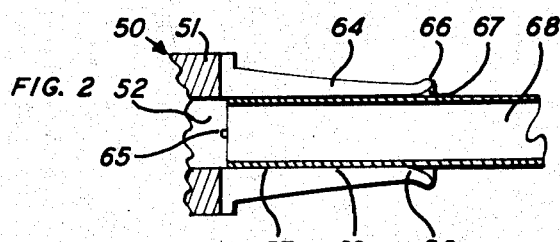
Figure 2 is a view similar to Fig. 1, but showing the parts in the respective positions assumed thereby when the tubing and coupling members are disposed in assembled, operative relation.

By referring first to Figures 1 and 2, the particulars of the flexible, stress-distributing means bridging the juncture of a coupling and the tubing to which it is attached will first be described, after which the manner of application of the stress-distributing means to different types of conventional coupling constructions will be illustrated by several examples.

The resilient, stress-distributing means of the present invention is indicated in its entirety at 50, and comprises a body portion 51, which, as will be described more fully hereinafter, preferably constitutes a portion of the coupling with which the stress-distributing means is to co-operate. Consequently, it is preferred that the distributing-means be constructed of the same material as that of which the remainder of the coupling member by which it is carried is formed, the principal requirement as far as selection of the material is concerned, being that it possess a material degree of inherent resilience, inasmuch as this is a feature contributing to the theory of operation of my invention. In most cases, therefore, the material of which the device is constructed will probably most frequently be brass, inasmuch as that is the material commonly employed for the construction of couplings of the type here under discussion, and this metal is altogether satisfactory for the purposes of the present invention, having an ample degree of resilience to meet the requirements to be described hereinbelow.

There is a bore 52 completely through the resilient means 50. From the body part 51 there extends a portion 55 having two tapers, one on the outside 53 and the other on the inside 54 in the bore 52. The outside taper 53 graduates the outside diameter of the tapered portion 55 from some maximum value near the body part 51 to some minimum value near the outer end of the tapered portion 55 at point 56.

The inside taper 54 gradually diminishes the inside diameter of bore 52 from some maximum value at point 57 adjacent the body 50 on said bore to some minimum value away from body part 51 at point 58 adjacent the outer end of the tapered portion 55. The tapered portion 55 is cut by a plurality of longitudinal, radial slots 59 which extend from the extreme outer end of the tapered portion 55 for a material distance toward the body part 51. The slots 59 may extend either to or beyond the inward end of the outside taper 53 into the body part 51. The slots 59 preferably extend beyond the inward end 57 of the inside taper 54 in the bore 52 for a material distance into the untapered part of the bore 52 inward of point 57 on said bore and into the body part 51.

Between the slots 59 the split parts of the tapered portion 55 form flexible extensions 64 which are integral with and extend from the body part 51. Thus the principal parts of the resilient means 50 are the body part 51 and the flexible extensions 64 having the outwardly convergent bore 52 therethrough. The base 65 of slots 59 is often referred to as the root of flexible extensions 64. The natural resiliency of the material of which the device is formed allows the flexible extensions 64 a certain amount of elastic radial flexure. The exact number of slots is determined by the desired degree of flexibility of the flexible extensions 64 consonant with the thickness of the tapered portion 55 as determined by internal taper 54 and external taper 53. It is apparent, therefore, that by selecting the proper number of slots 59 for a stress-distributor of given thickness wall, a nice balance may be assured for the several factors which contribute to the operation of the device.

A circumferential lip 66 extends uniformly around the outer ends of flexible extensions 64 and is cut by slots 59. The bore 52 extending through the lip 66 is reamed out to present a tapered throat 67 at the extreme outer end of the extensions 64. The maximum outside diameter of the tapered throat 67 is slightly greater than the maximum inside diameter of the bore 52 inwardly from point 57 on said bore so as to facilitate assembling the device upon the end of tubing 68 with which it is intended to co-operate. The tube 68 having an outside diameter a little less than the maximum inside diameter of bore 52 can be placed in the tapered throat 67 in axial alignment with the resilient means 50. Forcing the tube 68 against the tapered face of the throat 67 causes the flexible extensions 64 to be flexed radially outward due to their inherent elasticity thereby allowing the tube 68 to enter into bore 52. The elasticity of the inherently resilient flexible extensions 64 causes them to maintain close circumferential engagement with the enclosed tube 68.

The external taper 53 and the internal taper 54 of the flexible extension 64 are so designed in view of the particular material used that trusion of the tube 68 into the bore 52 causes the flexible extensions to flex gradually over their entire length, i. e., not only at some one point. In Figure 2 is shown the relative position of the flexible extensions 64 and the tube 68 when the tube has been forced into the bore 52. The internally tapered portion 54 between points 57 and 58 in the bore should contact tube 68 for substantially the entire length 69 of the bore 52 between the two said points. Optimum results are obtained for tube support if this is so, but excellent results are obtained if it is even partially so supported. The allowable variation of ±0.002 inch in outside diameter of standard market grades of tube 68 makes uniform contact only approximate. For greatest support good accuracy must be maintained for tube outside diameter and concentricity as related to bore 52. However, excellent results have been obtained with relatively loose fits.

The internal taper 54 between points 57 and 58 in the bore 52 is not necessarily straight but is usually increasingly convergent from point 57 to point 58. The exact nature of this longitudinal curve between 57 and 58 is determined by several factors, among them the resiliency of the material used, the longitudinal shape of exterior taper 53, the desired degree of flexibility, etc.

Due to the circumferential curvature of flexible extensions 64 they are stiffer to radial flexure than they would be if they were flat. However, if flat they make only tangential contact with the enclosed tube and thus do not offer circumferential support. Such types also cannot be made as easily on a lathe. This circumferential curvature further influences the longitudinal curvature of internal taper 54 between points 57 and 58. The greater the circumferential angle of a given flexible extension the stiffer it becomes. For example, in a brass coupling unit for a ⅜ inch ductile copper tube having three slots in the resilient means for one type of brass the maximum inside diameter at point 57 was approximately 0.380 inch or 0.005 inch oversize, and the minimum inside diameter at point 58 was approximately 0.360 inch or 0.020 inch under size, (or about 0.010 inch on a side). The longitudinal curvature in this case is very slight. In a four slotted stress-distributor, the curvature might be greater for the same type of brass. However, with different materials and different tube sizes different values must be used. In all cases the number of slots determines the angular curvature of both longitudinal and circumferential curves of the flexible extension. The greater the number of slots, the nearer an individual flexible extension approaches flatness, and for a given external taper, the greater must be the internal longitudinal curve between points 57 and 58 to afford the same support.

The shape of the longitudinal curve 54 between points 57 and 58 on bore 52 is also determined by the desired degree of support of the enclosed tube against flexure. It has been thoroughly verified by experiment that to attain the longest life in a fluid conductor, the graduation of the stiffness along the conductor from the high value in the coupling down to the lesser value in the tubing should be as nearly uniform as possible, and such graduation should be spread out over as long a section of the less stiff member as is practical. Excessively long flexible extensions do not support the tube clear out to the tips of the extensions. A method of elastically connecting the ends of the flexible extensions with a circular spring around the outer ends of the extensions inward of the lip has been used with some success. Very short flexible extensions cannot be made flexible enough without using too little metal to be practical. Each type of material seems to have a different set of optimum values which differ with different bore diameters.

Flexure or bending of the tube against the flexible extensions causes these extensions to "give" slightly. This elastic yielding of the resilient means is proportional to the degree of flexure within the limits of the material forming the resilient means. As in a spring leaf, the tips of the flexible extensions make a slidable contact with the enclosed tube. This slip between the flexible extensions and the enclosed tube makes for springy action not present if the flexible extensions are in any way soldered or otherwise rigidly attached to the enclosed tube. They carry the same yieldable support found in an ordinary leaf spring which would also be relatively less useful if its leaves were soldered or welded together. Thus the flexible extensions add support to the tube graduated outwardly from the coupling without greatly adding to its initial stiffness.

Due to the fact that the device is so constructed that before its engagement upon the tube 68 the bore 52 at the outer end of the flexible extensions 64 is slightly less than the outside diameter of the tube 68 which it is to receive, after the tube has been thrust into the bore the extensions exert pressure radially inwards against the outer circumferential wall of the tube. The gradual decrease in thickness of the metal constituting these extensions and the gradual increase in the rate at which the diameter of the bore 52 decreases as the distance from the body 51 increases preferably are so proportioned with respect to each other, as well as with respect to the particular material employed and the number of slots 59 that the pressure exerted by the fingers, or extensions 64, is substantially evenly distributed over the entire length of the tube with which the fingers make contact. Moreover, due to the yielding nature of the pressure exerted by the fingers 64, this substantially even distribution of pressure is maintained, even after flexure of the tube has occurred to an extent which causes displacement of one or more of the fingers from the positions thereof indicated in Figure 2. Therefore, whether the portion of the tube 68 embraced by the fingers 64 remains straight or is bent after its insertion into the device, the fingers 64 continue to give yielding support to the tube, which support is substantially evenly distributed throughout the entire length of the fingers. It is this evenly distributed support for a material length of the ductile tubing immediately adjacent the relatively stiff coupling structure that avoids the concentration of stress within the structure of the tubing which, when more conventional coupling devices have been employed, results so quickly in the fracture of the tubing. By providing support for the tubing which diminishes gradually as the distance from the coupling increases, I have caused whatever curvature may be imposed upon this portion of the tubing to be developed about a greater radius of curvature than would be the case were the resilient support herein described not provided, with a consequent elongation of the portion of the tubing wherein the curvature occurs. This, of course, reduces the amount of curvature occurring at any unit portion of the tubing, with the result that no portion of the tubing has as much stress imposed thereupon, although the total amount of curvature is not reduced. The same is true with respect to vibration to which the tubing is subjected. Whether stress imposed upon the tubing and of such a nature that it tends to cause fracture of the tubing, is the result of flexure or of sustained vibration, or of a combination of these two actions, the stress-distributing means of the present invention prevents concentration of that stress within such a short length of the tubing that serious strain and fracture thereof would quickly result—instead, my device causes the stress to be distributed over a relatively great length of the tubing, with a consequent reduction in the amount of such stress imposed upon any unit portion of the tubing. It is apparent, therefore, how the device of the present invention serves to prolong the useful life of ductile tubing with which it is associated.

One of the important features of the present invention is that it is applicable to any of the numerous types of coupling for ductile tubing commonly employed. However, in any case, and without regard to which type of coupling is employed, the stress-distributing means 50 incorporated therewith in accordance with the principles of the present invention comprises the flexible extensions or fingers 64 hereinabove described, carried by a body portion 51 and having a convergently tapered bore 52 therethrough. The several individual couplings illustrated are merely exemplary, inasmuch as it has not been attempted to illustrate every possible type of coupling with which the device of the present invention can be incorporated advantageously, but merely to illustrate the manner of its incorporation with a few of the better known types of ductile tubing couplings.

In Figures 3 to 17, inclusive, the several types of couplers illustrated all fall within the classification of couplings having the resilient means 50 of my invention formed integrally with a one-piece clamping member which serves as the means for attaching the tubing to the base part of the coupling.

Figure 3:
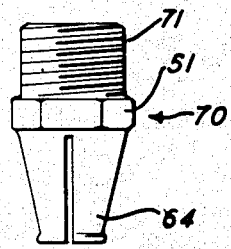
Figure 3 is a view in side elevation of the nut member of a conventional "inverted flared" type of ductile tubing coupling showing the manner of co-operatively associating my improved stress-distributing means of Figures 1 and 2 therewith by forming it integrally therewith.
Figure 4:
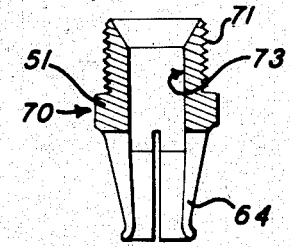
Figure 4 is a longitudinal, medial sectional view of the coupling member of Figure 3.
Figure 5:
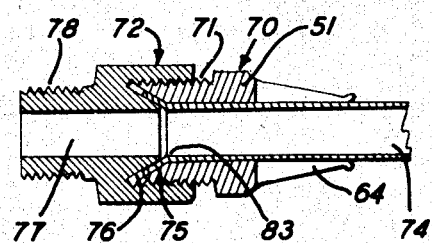
Figure 5 is a longitudinal, medial sectional view of an assembled coupling of the type employing the nut member of Figures 3 and 4, showing the manner in which it is employed to interconnect a length of ductile tubing with whatever structure carries the other member of the coupling.

Describing these various forms of couplings in greater detail, Figures 3, 4, and 5 illustrate a coupler of the type known in the trade as the "inverted nut" type, wherein the body portion 51 of my resilient stress-distributing means is formed integrally with the clamping ferrule 70, the resilient fingers 64 extending from the outer end of the ferrule. The other end of the ferrule 70 is provided with threads 71 engageable with interior threads of the base part 72. The bore 73 of the ferrule is adapted to receive the end of the tubing 74 therein; and the inner end of the bore 73 is flared, permitting a similarly flared portion 75 on the extreme end of the tubing to be engaged between the ferrule and a complementarily formed conical projection 76 on the base part 72 when the ferrule is tightened into the base part. In this manner, the end of the tubing is rigidly attached to the base part 72 with its bore in registry and communication with the bore 77 of the base part. The outer end of the base part 72 is also provided with threads 78 whereby the base and the tubing thus affixed thereto can be attached to whatever structure with which it may be desired to have the tube 74 communicate. It is apparent, therefore, that when the device has been assembled upon the tubing in the manner indicated, the resilient fingers 64 extending from the clamping ferrule 70, resiliently support said tube against lateral flexure in the coupling and against sharp bending stresses at the juncture of said tube and said base. The flexible extensions 64 in all cases bridge the juncture of tube 74 and coupling and regulate the radius of curvature of said tube at or near its point of contact with the coupling.

Point 83 at the base of the flare portion 75 of tube 74 is the place where stress concentrations have been found to be greatest in common types of couplings, but by adopting the present invention this point is thoroughly protected from all stress concentration by the flexible extensions 64 on the outer end of the coupler. Gradual flexure of the tube is allowed by the flexible extensions which distribute all stress resulting from such flexure over a material length of the tubing 74, instead of permitting it to be concentrated at the point 83.

Figure 6:
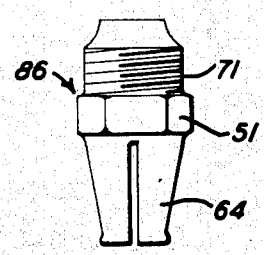
Figure 6 is a view similar to Fig. 3, but showing the stress-distributing means formed upon the nut member of a coupling of the well known "compression" type.
Figure 7:
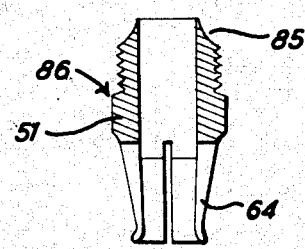
Figure 7 is a longitudinal, medial sectional view of the coupling member of Figure 6.
Figure 8:
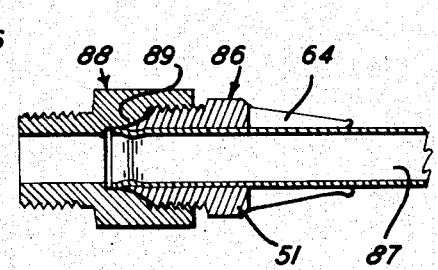
Figure 8 is a view similar to Figure 5, but showing the manner in which the coupling member of Figures 6 and 7 secure the end of the ductile tubing within the coupling.

Figures 6, 7, and 8 show an "inverted nut" type of coupling similar to that of Figures 3, 4, and 5, but employing a modified means for attaching the tubing thereto. This attaching means comprises a tapered end 85 on the inner end of the ferrule 86, which is deformable against the tubing 87 when the ferrule 86 is tightened into the base part 88, inasmuch as the base 88 is provided with a tapered seat having a specially curved surface 89 against which the tapered end 85 engages. The curvature of this seat is such that the tapered end 85 is collapsed inwards into such tight engagement with the tubing that the tubing is rigidly and tightly attached to the coupling. As in the case of the coupler of Figures 3, 4, and 5, the flexible and resilient fingers 64 being carried by the ferrule 86, which in turn is rigidly mounted upon the base part 88, the fingers 64 are enabled to afford the desired resilient support to the tube enclosed thereby and distribute any stress resulting from flexure and/or vibration over sufficient length of the tube to mitigate danger of fracture of the tube.

Figure 18:
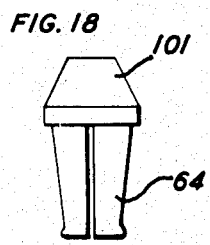
Figure 18 is a view in side elevation of a sleeve intended for use as a portion of a coupling of the "compression" type and having stress-distributing means embodying the principles of the present invention formed integrally therewith.
Figure 19:
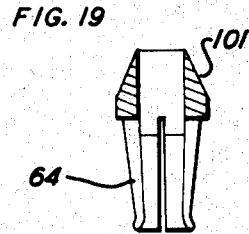
Figure 19 is a longitudinal, medial sectional view of the sleeve of Fig. 18.
Figure 20:
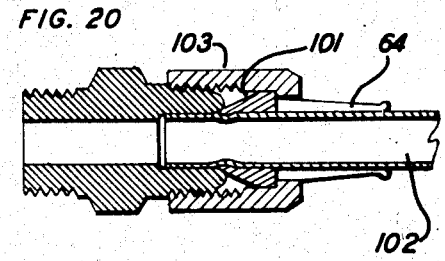
Figure 20 is another view similar to Figure 5, but showing the manner in which the coupling member of Figures 18 and 19 secures the end of the ductile tubing within the coupling.
Figure 21:
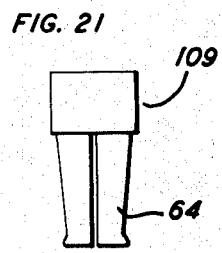
Figure 21 is a view similar to Figure 18, but showing the stress-distributing means of the present invention formed integrally with the sleeve member of a coupling of the "flared tube" type.
Figure 22:
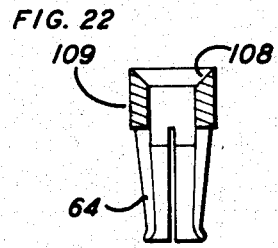
Figure 22 is a longitudinal, medial sectional view of the coupling member of Figure 21.
Figure 23:
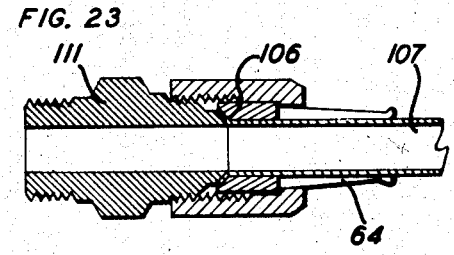
Figure 23 is another view similar to Figure 5, but showing the manner in which the coupling member of Figures 21 and 22 secures the end of the ductile tubing within the coupling.
Figure 24:
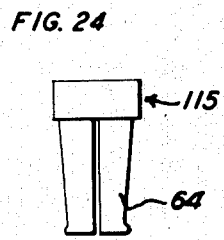
Figure 24 is another view similar to Figure 18, but showing the stress-distributing means of the present invention formed integrally with the sleeve of a coupling of the "soldered ring" type.
Figure 25:
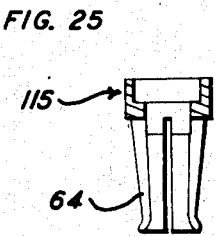
Figure 25 is a longitudinal, medial sectional view of the coupling member of Figure 24.
Figure 26:
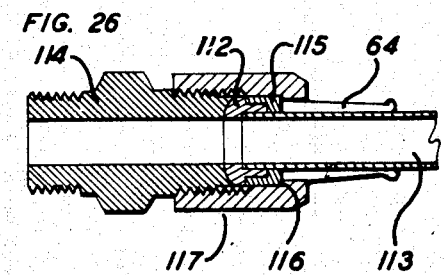
Figure 26 is another view similar to Fig. 5, but showing the manner in which the coupling member of Figures 24 and 25 secures the end of the ductile tubing within the coupling.
Figure 9:
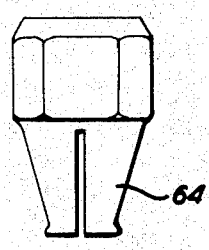
Figure 9 is another view similar to Fig. 3, but showing the stress-distributing means formed as a portion of the nut member of a coupling of the "compression ring" type.
Figure 10:
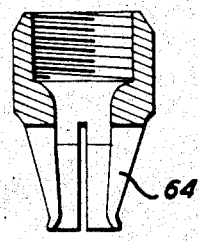
Figure 10 is a longitudinal, medial sectional view of the coupling member of Fig. 9.
Figure 11:
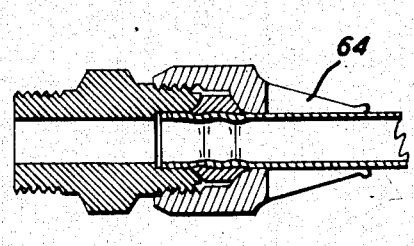
Figure 11 is another view similar to Figure 5, but showing the manner in which the coupling member of Figures 9 and 10 secures the end of the ductile tubing within the coupling.
Figure 12:
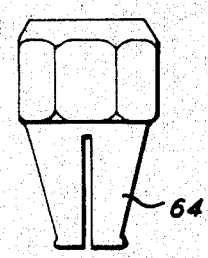
Figure 12 is another view similar to Fig. 3, but showing the stress-distributing means formed as a portion of the nut member of the "standard flared tube" type of coupling.
Figure 13:
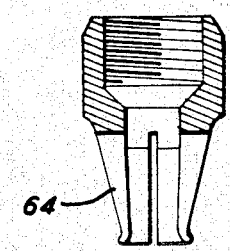
Figure 13 is a longitudinal, medial sectional view of the coupling member of Fig. 12.
Figure 14:
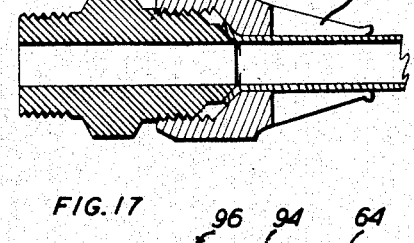
Figure 14 is another view similar to Fig. 5, but showing the manner in which the coupling member of Figures 12 and 13 secures the end of the ductile tubing within the coupling.
Figure 15:
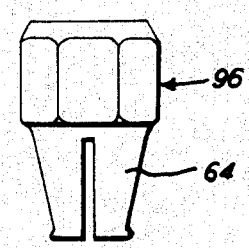
Figure 15 is another view similar to Fig. 3, but showing the stress-distributing means formed as a portion of the nut member of a coupling of the "soldered ring" type.
Figure 16:
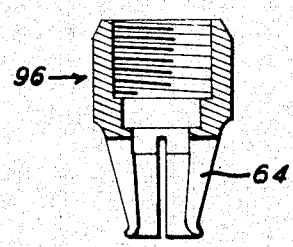
Figure 16 is longitudinal, medial sectional view of the coupling member of Fig. 15.
Figure 17:
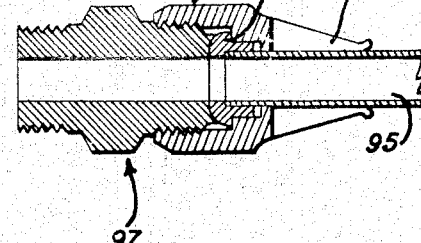
Figure 17 is another view similar to Fig. 5, but showing the manner in which the coupling member of Figures 15 and 16 secures the end of the ductile tubing within the coupling.

Figures 9 to 17 inclusive show the older external nut type couplings; figures 9 to 11 inclusive show a standard compression type; Figures 12 to 14 inclusive show a standard flared tube type; and Figures 15 to 17 inclusive show a standard soldered tube type. In all of these cases the support for the tube is embodied in the resilient means integral with the ferrule. The resilient means is the same as in the inverted types and its solid mounting upon the base gives identical flexible support for the enclosed tube regardless of which of the three types of tube seal is used. It should be noted that a special ring 94 is soldered to the end of the tube 95 in the modification of Figures 15 to 17 inclusive. This ring 94 is compressed between the ferrule 96 and the base 97. The principal difference between the modifications thus far described and those forming the subject matter of Figures 18 to 26, inclusive, is that each of the latter, instead of employing a one-piece ferrule serving the double function of clamping the tubing to the base part and also providing the resilient support for the adjacent portion of the tubing in accordance with the principles of the present invention, are provided with a two-piece structure. This, in each of the three illustrated forms, comprises a sleeve interiorly threaded to permit its engagement upon its associated base part, and a compression ring cooperatively disposed inside the associated sleeve and adapted to be pressed into clamping engagement with the tube when the sleeve is tightened. As will become apparent from inspection of Figures 18 to 26 inclusive, all three of these couplings closely resemble each other, the only difference between them being in the manner of connection between the compression ring and the tube. In the case of the modification illustrated in Figures 18, 19, and 20, the compression ring 101 is collapsed against the outer wall of the tubing 102 when the threaded sleeve 103 is tightened. Thus corresponding closely to the form of coupling described hereinabove in connection with Figures 6, 7, and 8. The form of coupling shown in Figures 21, 22, and 23 makes engagement with the tubing by clamping the flared end 106 of the tubing 107 between a conical flared portion 108 at the inner end of the compression ring 109 and a complementarily formed extension on the end of the base part 111. In the modification of Figures 24, 25, and 26 the compression ring takes the form of an annulus 112 rigidly secured to the end of the tubing 113 by solder or its equivalent. This soldered ring is clamped against the base part 114 by the inner end of a sleeve 115 which embraces the tube 113 and which is engaged by a shoulder 116 on a threaded sleeve 117 which may be tightened upon the base part 114. In each of these three forms the resilient stress-distributing means of the present invention, instead of being formed integrally with the threaded, base-engaging sleeve, is formed upon the ring which is disposed inside that element and which is adapted to be pressed into sealing engagement with the tube (or with the soldered ring 112 as the case might be), when the threaded sleeve is tightened. However, the action of the resilient stress-distributing means in supporting the adjacent portion of the tubing is identical with that of the modifications illustrated in the Figures 3 to 17 inclusive.

I claim:

1. In a tubing connector of the character described, a base part adapted for attachment to a supporting structure, a clamping ferrule threadedly engaged with said base part and adapted to receive an end of tubing therein, means actuated when said ferrule is tightened with respect to said base part for establishing fluid-tight and mechanically rigid interconnection between said tubing and said connector, and stress-distributing means adapted to bridge the juncture of said connector and tubing and comprising a body portion and a plurality of resiliently flexible fingers extending from one end of said body portion, said body portion and fingers co-operating to define a bore adapted to receive said tubing therein but said fingers being convergent toward their outer ends whereby said bore is of gradually diminishing diameter as the distance from said body portion increases to an extent requiring spreading of the fingers as said tubing is thrust into said bore.

2. In a tubing connector of the character described, a base part adapted for attachment to a supporting structure, a clamping ferrule threadedly engaged with said base part and adapted to receive an end of tubing therein, means actuated when said ferrule is tightened with respect to said base part for establishing fluid-tight and mechanically rigid interconnection between said tubing and said connector, and stress-distributing means adapted to bridge the juncture of said connector and tubing and comprising a body portion and a plurality of resiliently flexible fingers extending from one end of said body portion, said body portion and fingers co-operating to define a bore adapted to receive said tubing therein but said fingers being convergent towards their outer ends whereby said bore is of gradually diminishing diameter as the distance from said body portion increases to an extent requiring spreading of the fingers as said tubing is thrust into said bore and each of said fingers being of gradually decreasing thickness as the distance from said body portion increases whereby the lateral support offered said tubing by said fingers is of gradually diminishing intensity from the inner to the outer ends of said fingers.

3. In a tubing connector of the character described, a base part adapted for attachment to a supporting structure, a clamping ferrule threadedly engaged with said base part and adapted to receive an end of tubing therein, means actuated when said ferrule is tightened with respect to said base part for establishing fluid-tight and mechanically rigid interconnection between said tubing and said connector, and stress-distributing means adapted to bridge the juncture of said connector and tubing and comprising a body portion and a plurality of resiliently flexible fingers extending from one end of said body portion, said body portion and fingers co-operating to define a bore adapted to receive said tubing therein but said fingers being convergent towards their outer ends whereby said bore is of gradually diminishing diameter as the distance from said body portion increases to an extent requiring spreading of the fingers as said tubing is thrust into said bore and each of said fingers being of gradually decreasing thickness as the distance from said body portion increases whereby the lateral support offered said tubing by said fingers is of gradually diminishing intensity from the inner to the outer ends of said fingers, said flexible fingers slidably engaging said tubing whereby they are adapted to offer said lateral support of said tubing without adding materially to the stiffness thereof.

4. In a connector for relieving stress developed in tubing co-operatively associated therewith when said tubing is subjected to flexure or vibration, resilient means for bridging the juncture of said connector and tubing on which it is mounted comprising a tubular body portion carried by said connector and a plurality of flexible extensions co-operating with each other to define a tubular structure arranged coaxially with said body portion, said extensions being disposed in outwardly convergent relation to an extent that spreading of said extensions is required to insert said tubing thereinto.

5. In a connector for relieving stress developed in tubing co-operatively associated therewith when said tubing is subjected to flexure or vibration, resilient means for bridging the juncture of said connector and tubing on which it is mounted comprising a tubular body portion carried by said connector and a plurality of flexible extensions co-operating with each other to define a tubular structure arranged coaxially with said body portion, the bore of said resilient means tapering toward the outer ends of said extensions whereby spreading of said extensions is required to insert tubing thereinto, and said bore being flared at the ends of said extensions to provide a tapering entrance throat to facilitate thrusting tubing into said bore and said deformation of said extensions.

6. A fluid conductor comprising in combination a tube subject to flexure, a connector interposed therein, said tube being less stiff than said connector whereby flexure of said conductor tends to concentrate stress in said tube adjacent the juncture thereof with said connector, and means for distributing such stress throughout a material length of said tube comprising a plurality of resilient fingers mounted upon said connector and extending therefrom along said tube in encircling relationship therewith, said fingers being formed with their outer ends in convergent relationship to a diameter less than that of said tube whereby they are caused to spread when said tube is thrust therebetween to increase the intimacy of their contact with said tube when in assembled relationship therewith.

7. In a tubing connector, means for bridging the juncture of said connector and the tubing associated therewith thereby to relieve stress developed in said tubing, which comprises a tubular body portion encircling said tubing and a plurality of flexible fingers extending outwardly from said body portion and cooperating with each other to define a tubular structure coaxial with said body portion, said fingers being disposed in outwardly convergent relation to an extent that spreading of said fingers is required to insert said tubing therein.

8. A stress distributing device for relieving stress developed in tubing cooperatively associated therewith, comprising a central body portion encircling said tubing, means on said body portion for clamping said device and said associated tubing to a base, and a plurality of flexible extensions of said body portion cooperating with each other to define a tubular structure arranged coaxially with said body portion, said extensions being disposed in outwardly convergent relation to an extent that spreading of said extensions is required in order to insert said associated tubing thereinto.

ROBERT E. SNYDER.